United States Patent [19]
Nishimura

[11] Patent Number: 5,352,971
[45] Date of Patent: Oct. 4, 1994

[54] ELECTRONIC CONTROL APPARATUS FOR A VEHICLE

[75] Inventor: Yukinobu Nishimura, Himeji, Japan

[73] Assignee: Mitsubishi Denki Kabushiki Kaisha, Tokyo, Japan

[21] Appl. No.: 29,564

[22] Filed: Mar. 11, 1993

[30] Foreign Application Priority Data

Apr. 10, 1992 [JP] Japan .................. 4-090944

[51] Int. Cl.$^5$ .............................. H02J 7/14
[52] U.S. Cl. ........................ 322/27; 322/25; 322/28; 123/339
[58] Field of Search ............ 322/25, 27, 28; 123/339

[56] References Cited

U.S. PATENT DOCUMENTS

| | | | |
|---|---|---|---|
| 4,463,305 | 7/1984 | Wineland et al. | 322/10 |
| 4,520,272 | 5/1985 | Danno et al. | 123/339 X |
| 4,629,968 | 12/1986 | Butts et al. | 322/28 X |
| 4,651,081 | 3/1987 | Nishimura et al. | 320/64 |
| 4,661,760 | 4/1987 | Goto et al. | 322/27 |
| 4,682,044 | 7/1987 | Hotate et al. | 322/28 X |
| 4,689,545 | 8/1987 | Komurasaki et al. | 322/28 X |
| 4,789,817 | 12/1988 | Asakura et al. | 322/28 |
| 4,794,898 | 1/1989 | Kato | 123/339 |
| 4,839,579 | 6/1989 | Kaneyuki et al. | 322/25 |
| 4,989,565 | 2/1991 | Shimomura et al. | 123/339 |
| 5,216,350 | 1/1993 | Judge et al. | 322/25 |

FOREIGN PATENT DOCUMENTS 222099 12/1984 Japan .

*Primary Examiner*—R. J. Hickey
*Attorney, Agent, or Firm*—Sughrue, Mion, Zinn, Macpeak & Seas

[57] ABSTRACT

An output current of an alternator and a load current are detected by current sensors 5 and 6. When the output current of the alternator has a predetermined value or lower, generation of electricity by the alternator is stopped. When the load current has a predetermined value or higher, generation of electricity is resumed. When the load current is increased, a load-responsive control for the alternator and an intake air increasing control is performed, and the generation of electricity of the alternator is stopped at an acceleration time of the engine, and the output of the alternator is gradually increased.

2 Claims, 10 Drawing Sheets

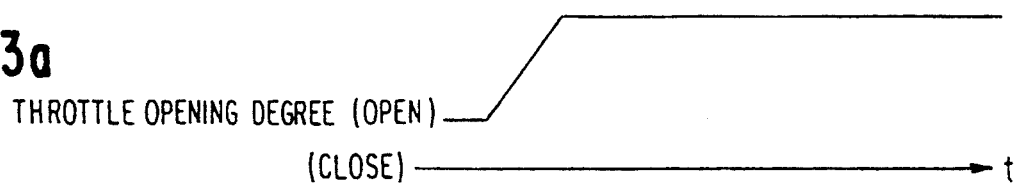
FIG.3a THROTTLE OPENING DEGREE (OPEN) (CLOSE)
FIG.3b ACCELERATION FLAG "1" "0"
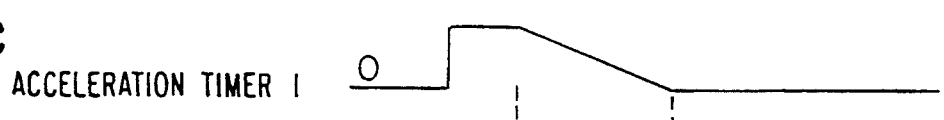
FIG.3c ACCELERATION TIMER 1
FIG.3d ACCELERATION TIMER 2
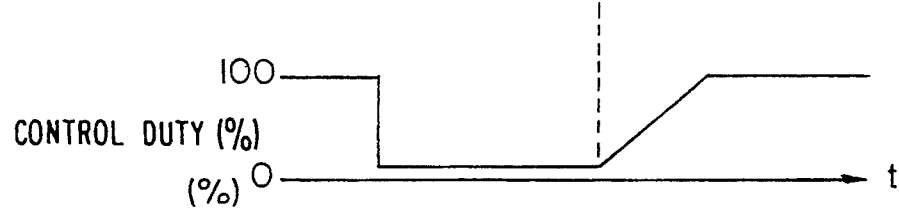
FIG.3e CONTROL DUTY (%)
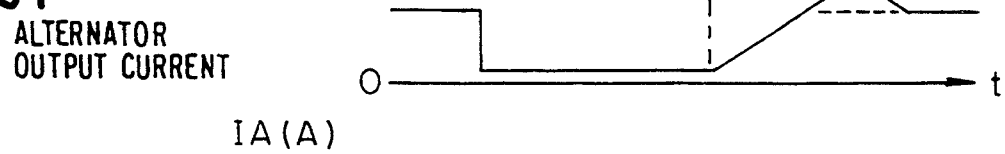
FIG.3f ALTERNATOR OUTPUT CURRENT IA(A)
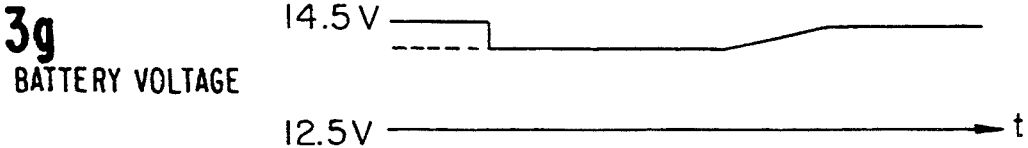
FIG.3g BATTERY VOLTAGE FIG.5a ELECTRICAL LOAD
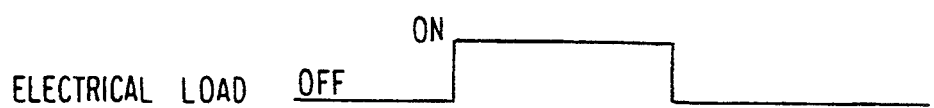
FIG.5b ALTERNATOR OUTPUT CURRENT IA(A)
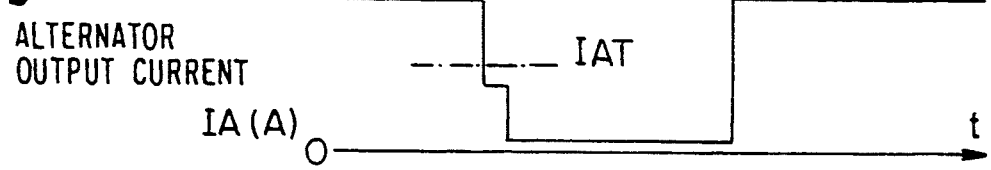
FIG.5c LIGHT LOAD FLAG
FIG.5d LOAD CURRENT IL(A)
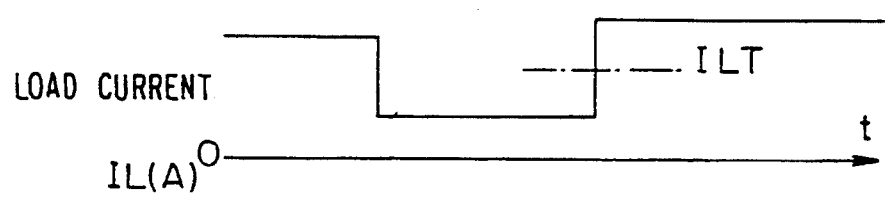
FIG.5e CONTROL DUTY (%)
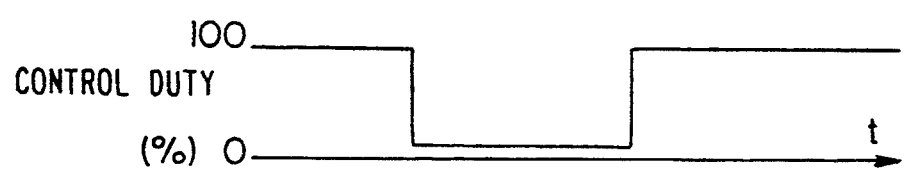

ELECTRICAL LOAD

LOAD CURRENT
IL (A)

LOAD-RESPONSIVE TIMER 1

LOAD-RESPONSIVE TIMER 2

CONTROL DUTY (%)

ALTERNATOR OUTPUT CURRENT
IA(A)

FIG.8a
ELECTRICAL LOAD
FIG.8b
LOAD CURRENT
IL(A)
FIG.8c
ISCV DUTY (%)
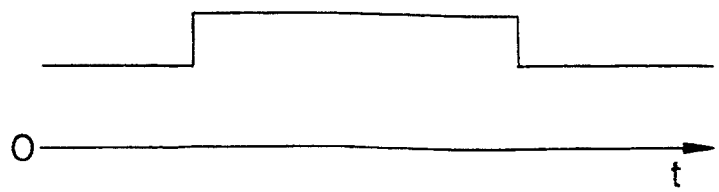
FIG.8d
ENGINE OUTPUT TORQUE
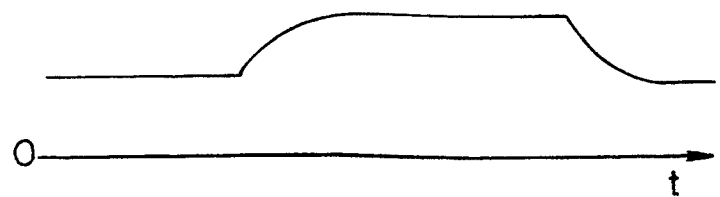
FIG.8e
ENGINE REVOLUTION NUMBER
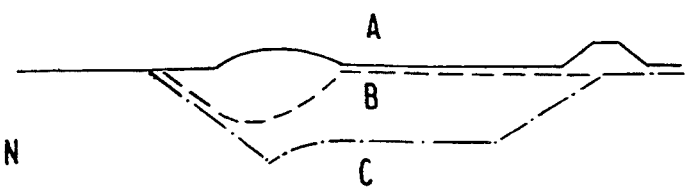
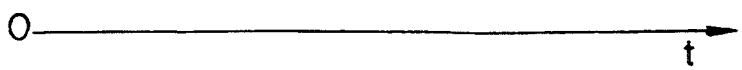

ELECTRONIC CONTROL APPARATUS FOR A VEHICLE

BACKGROUND OF THE INVENTION

1. Field of the Invention

The present invention relates to an electronic control apparatus for a vehicle for performing control an alternator in association with controlling the number of revolutions of the engine during idling.

2. Discussion of Background

There has been known a method of controlling generation of electricity in an alternator, as shown in, for instance, Japanese Unexamined Patent Publication No. 222099/1984, in which a load current is detected and an electrical voltage is changed depending on the value of detected load current.

Further, in a method of controlling the number of revolutions during idling in association with control of an alternator, there has been known, for instance, Japanese Unexamined Patent Publication No. 170553/1988 in which air quantity is controlled. In the publication, a current through an electrical load is detected and the number of revolutions of the engine during idling is controlled depending on the detected load current.

A technique of controlling an alternator is disclosed in, for instance, Japanese Unexamined Patent Publication No. 248238/1986. In this technique, an output current from an alternator is determined from an intermittent signal produced by feeding and interrupting a current to the field coil of the alternator, i.e. a field duty signal, and the current to be supplied to the field coil is forcibly turned off in an increase of the duty, and thereafter, the current is turned on to perform control for gradually increasing the duty.

The conventional control of generation of electricity in the alternator is conducted based on either a load current or a battery charging current, and accordingly, when the generation of electricity is stopped when a small load current is being provided, the charging to the battery is insufficient. On the other hand, when the generation of electricity is stopped when a large charging current is being provided to the battery, a danger of exhaustion of the battery exists. Further, when the generation of electricity is stopped when small charging current is being provided to the battery, there is a problem that the battery may be exhausted when a large electrical load is applied.

In controlling the number of revolutions of the engine during idling in association with controlling an alternator, there are two techniques: a technique of controlling an air quantity in response to an electrical load current and a load-responsive control technique wherein the output of the alternator is stopped by controlling the same when the output of the alternator is increased, and thereafter, the output is gradually increased.

In the former case, it is impossible to prevent a drop of revolution number at the initial stage of the connection of an electrical load since the air quantity is controlled. On the other hand, in the later case, it is also impossible to prevent a drop in the number of revolutions of the engine at the time of the connection of an electrical load since determination is made upon an increase in the field duty.

In a case that the output of the alternator is forecast from a field duty, an output current is obtained from the calculation of a field duty multiplied with a revolution number of engine when a load to the engine is light. However, in this technique, there is a large error because a resistance in the field coil is changed by an ambient temperature, whereby the performance of control is poor.

SUMMARY OF THE INVENTION

It is an object of the present invention to provide an electronic control apparatus for a vehicle which is capable of reducing fuel cost, improving the output performance as well as idle quality with a simple structure by controlling the alternator in association with controlling idling resolution.

In accordance with the present invention, there is provided an electronic control apparatus for a vehicle which comprises an alternator for charging a battery and supplying a load current, means for directly or indirectly detecting an output current from the alternator, means for directly or indirectly detecting the load current, and means for stopping, for a predetermined time, generation of electricity in the alternator when the output current has a predetermined value or lower and containing the generation of electricity when the load current has a predetermined value or higher.

Also in accordance with the present invention, there is provided an electronic control apparatus for a vehicle which comprises an alternator for charging a battery and supplying a load current, means for directly or indirectly detecting the load current, and means for stopping for a predetermined time generation of electricity in the alternator when the load current is increased, and, thereafter, gradually increasing the output of the alternator as well as increasing an air quantity to be supplied to the engine.

Further in accordance with the present invention, there is provided an electronic control apparatus for a vehicle which comprises an alternator for charging a battery and supplying a load current, means for detecting an acceleration of the engine, and means for stopping, for a predetermined time, generation of electricity in the alternator when the engine is accelerated, and, thereafter, gradually increasing the output of the alternator.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIGS. 3(a)–3(g) comprise a time chart showing the operation of controlling generation of electricity at an acceleration time in the electronic control apparatus according to the present invention;

FIGS. 5(a)–5(e) comprise a time chart showing the operation of controlling generation of electricity when a light load is applied in the electronic control apparatus;

FIGS. 8(a)-8(b) comprise a time chart showing a load correcting operation in an idling revolution control for the electronic control apparatus of the present invention;

DETAILED DESCRIPTION OF PREFERRED EMBODIMENTS

Figure 1:
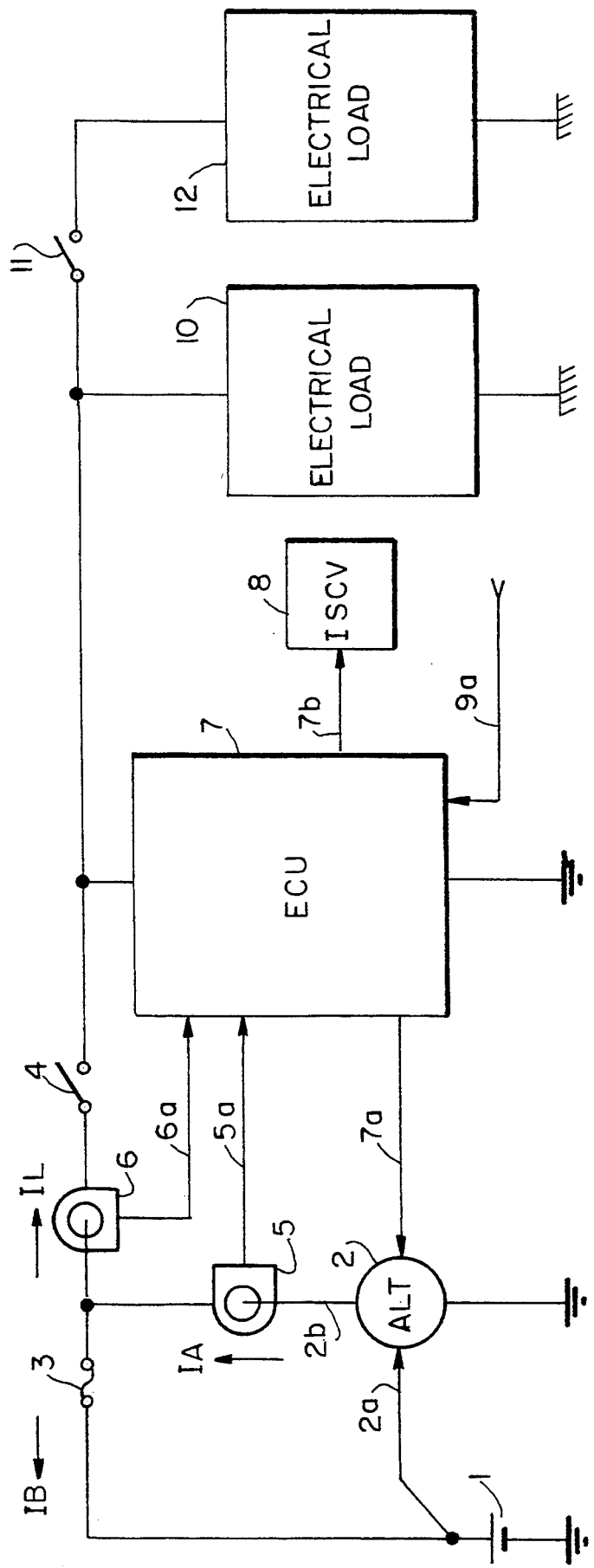
FIG. 1 is a block diagram of an embodiment of the electronic control apparatus according to the present invention.

Referring to the drawings, the electronic control apparatus of the present invention will be described.

FIG. 1 is a block diagram showing the construction of a first embodiment of the electronic control apparatus or a vehicle wherein reference numeral 1 designates a battery, and numeral 2a designates a battery voltage signal. Numeral 2 designates an alternator which controls, as the basic function, an output current 2b based on the battery voltage signal 2a and a voltage signal produced by itself, and controls, as another function, the output current 2b by a controlling signal 7a inputted from the outside, and numeral 3 designates a use or a fusible link received in a main fuse box. A line for the output of the alternator and a power source line are jointed at a point A which is located at the downstream side of the fuse 3.

Numeral 4 designates a key switch, numeral 5 designates a current sensor for detecting an output current $I_A$ from the alternator 2, numeral 5a designates a voltage signal corresponding to the value of the output current $I_A$, numeral 6 designates a current sensor for detecting an electrical load current $I_L$ and numeral 6a designates a voltage signal corresponding to the electrical load current $I_L$. When the direction of current for charging the battery 1 at the upstream side of the point A is assumed to be positive, and the value of battery charging current is $I_B$, a relation of $I_A = I_B + I_L$ is established.

Numeral 7 designates a control unit (ECU) adapted to receive the voltage signals 5a, 6a and a signal 9a and generates a control signal 7a in accordance with a predetermined program by which the output of the alternator 2 is controlled, and to generate a control signal 7b by which an ISC valve (ISCV) 8 as an actuator for controlling idling revolution is controlled. The signal 9a includes a crank angle signal to obtain the number of revolutions of the engine, a throttle opening signal for determining acceleration or deceleration, an idle switch signal for detecting an idling position of a throttle valve, an intake air quantity signal and a signal from a starting switch, a gearing mechanism (by which a neutral position or a gear-connection position is detected), a brake switch or a headlight switch.

Numeral 10 designates an electrical load which is always applied to the engine in operation. The electrical load includes various kinds of control units including the ECU 7, an ignition coil, an injector and so on. Numeral 11 designates a switch for another electrical load 12, which is applied to the engine when the switch 11 is turned on, the electrical load including a motor fan, a blower, a rear defogger, headlights, power windows and so on.

The operation of the electronic control apparatus of the above-mentioned embodiment will be described. Since the control system of the electronic control apparatus is complicated, description will be made by classifying the system into three groups for easy understanding: (1) control of generation of electricity in the alternator ((1-1) control of stopping generation of electricity in the alternator at an acceleration time (improvement of acceleration performance), ((1-2) control of stopping generation of electricity in the alternator in a light load condition (improvement of fuel cost), (1-3) control of the load-responsive characteristic of the alternator (stabilizing idling revolution)), (2) control of idling revolution ((2-1) correction of ISC load (stabilizing idling revolution)).

As described above, the control of generation of electricity in the alternator is classified into the control of stopping generation of electricity at the time of acceleration which is mainly for improving the acceleration performance, the control of stopping generation of electricity in the application of a light load which is mainly for improving fuel cost and the control of the load-responsive characteristic which is for stabilizing the idling operation. The operations of control are described in detail with respect to time charts and flow-charts in the order of processing, namely, processing of an acceleration time, processing of a light load application time and processing of an idling time.

Figure 2:
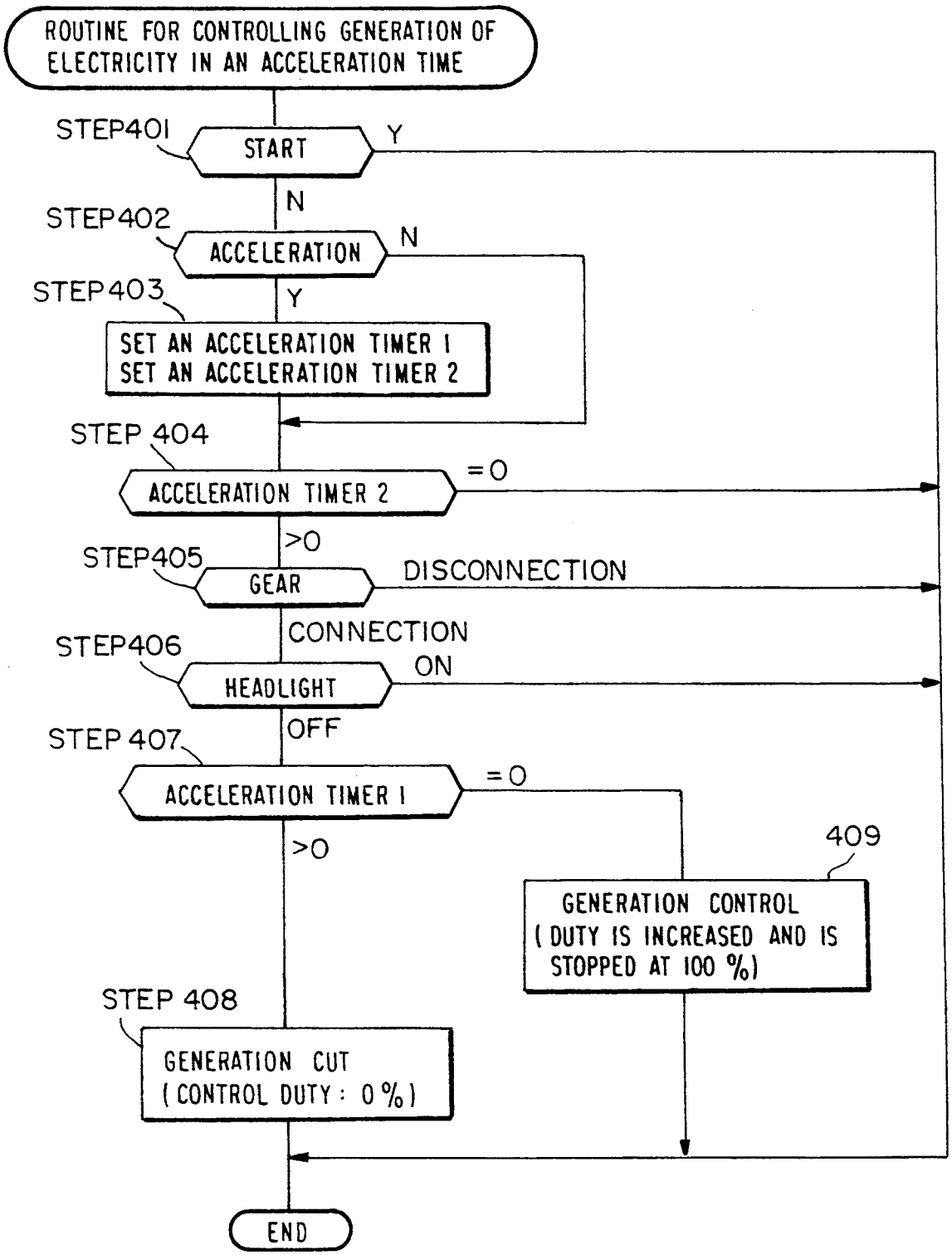
FIG. 2 is a flowchart showing the operation of controlling generation of electricity at an acceleration time in the electronic control apparatus shown in FIG. 1.

FIG. 2 is a flowchart showing a routine for controlling generation of electricity at an acceleration time and FIG. 3 is a time chart in the operation for the routine.

In FIG. 2, determination is made as to whether or not the engine is starting at Step 401. When the engine is starting, the processing of the routine ends The determination of the starting is made by the operation of the starting switch. Since the operational condition is unstable during starting of the engine, there is a possibility of erroneously determining acceleration, and the control of generation of electricity therefore should not be performed.

At Step 402, the acceleration is determined. The acceleration is generally determined by using a change of throttle opening degree or a change of intake air quantity. In this embodiment, the determination of acceleration is made when a change of throttle opening degree assumes a predetermined value or higher as shown in FIG. 3a, and then, an acceleration flag is set as "1" as shown in FIG. 3b.

When the determination of acceleration is made, acceleration timers 1 and 2 are set at Step 403. These timers have such a relation of acceleration timer 1 < acceleration timer 2. Further, these timers count down at respective rates until the values become 0, for each predetermined time interruption treatment. The operation of the acceleration timers 1, 2 is shown by operation waveforms in FIGS. 3c and 3d.

At Step 404, determination is made as to whether or not the acceleration timer 2 counts 0. When affirmative, the processing routine is finished. When a value counted is not 0, determination is made as to whether or not the gear is in a connection state or a disconnection state at Step 405. When the gear is in a connection state, then, determination is made as to whether the headlights are turned on or off at Step 406.

When the gear is in a connection state and the headlights are turned off, the control of generation of electricity at an acceleration time or the control of stopping generation of electricity is conducted. Since the control of stopping generation of electricity at an acceleration time is to improve an acceleration performance, it is effective only when the gear is in a connection state and the automobile is driven. When the control of stopping generation of electricity at an acceleration time is conducted when the automobile is driven while the headlights are operated, the headlights become instantaneously dark (the voltage is dropped from 14.5 V to 12.5 V). Accordingly, the control of stopping generation of electricity is not conducted in order to assure safety during the headlights being operated.

At Step 407, determination is made as to whether or not the acceleration timer 1 is 0. When the acceleration timer 1 does not show 0, the operation step is moved to Step 408 to stop generation of electricity. Namely, the duty of the control signal 7a to be supplied to the alternator 2 is made 0%. When the acceleration timer 1 shows 0, the operation step is moved to Step 409 where the control duty is increased by a predetermined value. In this case, when the control duty is 100% or higher, it remains at 100%.

FIG. 3e shows a change of the control duty; FIG. 3f shows an output current $I_A$ from the alternator 2 according to the change of the control duty; and FIG. 3g shows a voltage in the battery 1. In FIG. 3f, the output current $I_A$ of the alternator 2 increases beyond 100% after the control of generation of electricity has been performed. This is because lost power due to an electric discharge by the battery 1 during the control of generation of electricity is recovered.

Figure 4:
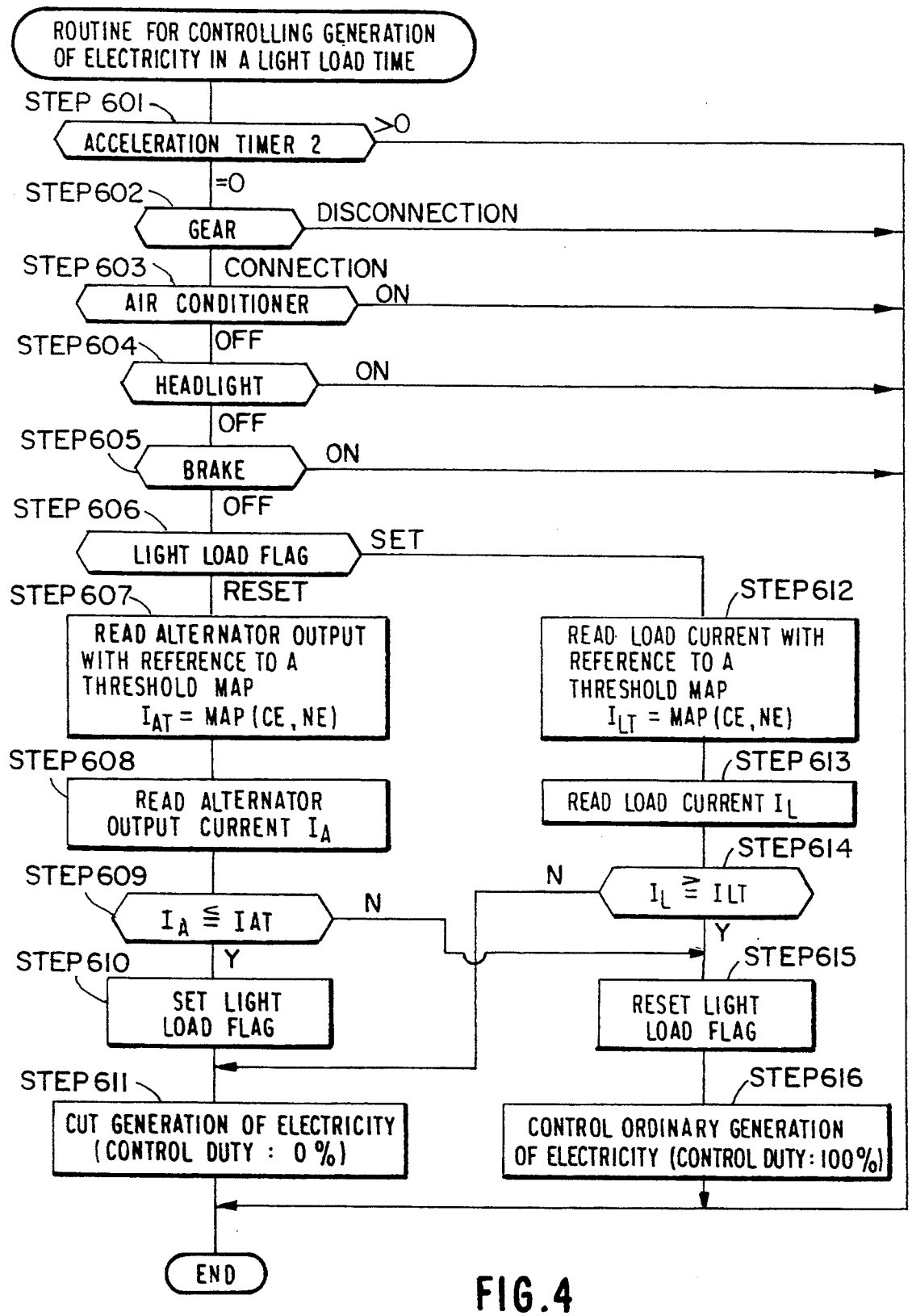
FIG. 4 is a flowchart showing the operation of controlling generation of electricity when a light load is applied in the electronic control apparatus of the present invention.

FIGS. 4 and 5 are respectively a flowchart and a time chart concerning the control of stopping generation of electricity at the time of the application of a light load.

In FIG. 4, determination is made as to whether or not the acceleration timer 2 is 0 at Step 601. When the acceleration timer 2 shows 0, the operation step is moved to Step 602. The operation of Step 602 means that the operation of the acceleration timer 2 dominates over that of the acceleration timer 1.

At Step 602, determination is made as to whether the gear is in a connection state or a disconnection state. When it is found that the gear is in a connection state, the operation step is moved to Step 603. It is because the number of engine revolutions during idling is increased even though the generation of electricity is stopped to reduce a load to the engine when the gear is in a disconnection state.

At Step 603, determination is made as to whether the air conditioner is turned on or off. When the air conditioner is in an off state, the operation step is moved to Step 604. This operation step is to prevent the battery 1 from exhausting by a consumption power of air conditioner.

At Step 604, determination is made as to whether the headlights are turned on or off. When headlights are turned off, the operation step is moved to Step 605. This is because the headlights suddenly become dark during the cruising of the automobile if the generation of electricity is stopped during the turn-on time of the headlights.

At Step 605, determination is made as to whether the brake is turned on or off. When the brake is turned off, the operation step is moved to Step 606. This is because the engine torque is increased when the generation of electricity is stopped during a braking-off time.

At Step 606, determination is made as to whether a light load flag is set or reset. When the flag is in a reset state, the operation step is moved to Step 607 where a threshold value $I_{AT}$ of the output current $I_A$ of the alternator 2 is obtained with reference to a previously prepared two-dimensional map which is prepared by using factors of engine revolution and load. In this case, charging efficiency (CE) is used as the load, and the charging efficiency is previously obtained by dividing an intake air quantity by a revolution number which is necessary to obtain a fuel quantity in a routine (not shown). Instead of using the charging efficiency, a boost value or a throttle opening degree may be used.

At Step 608, an actual output current $I_A$ from the alternator 2 is read, and the actual output current $I_A$ is compared with the threshold value $I_{AT}$ at Step 609. When $I_A \leq I_{AT}$, the operation step is moved to Step 610 where the light load flag is set in the determination that a light load is applied. When not $I_A \leq I_{AT}$, the light flag is reset at Step 615. At Step 611, the generation of electricity is stopped, namely, the control duty is made 0%.

On the other hand, when the light load flag is determined at Step 606 to be set, a threshold value $I_{LT}$ of a load current $I_L$ is obtained by calculation at Step 612. The calculation is conducted with reference to a two-dimensional map which is prepared by using factors of engine revolution number and load. An actual load current $I_L$ is read at Step 613, and the actual load current $I_L$ is compared with the threshold load current $I_{LT}$ at Step 614. When $I_L \geq I_{LT}$, the light load flag is reset at Step 615. Then, the control of stopping generation of electricity is terminated and the ordinary control of generating electricity is conducted at Step 616, namely, the control duty is made 100%. When $I_L < I_{LT}$ at Step 614, the control of stopping generation of electricity is continued at Step 611.

In the time chart of FIG. 5, FIG. 5a shows a change of an electrical load being turned on and off, FIG. 5b shows the output current $I_A$ of the alternator and the threshold value $I_{AT}$ when the control of stopping generation of electricity is started, FIG. 5c shows a change of the light load flag, FIG. 5d shows the load current $I_L$ and the threshold value $I_{LT}$ when the control is finished, and FIG. 5e shows a change of the control duty. In the FIG. 5, the load current is reduced after the generation of electricity is stopped, however, the load current does not become 0 because a constant electrical load such as the electrical load 10 shown in FIG. 1 is always applied.

Figure 6:
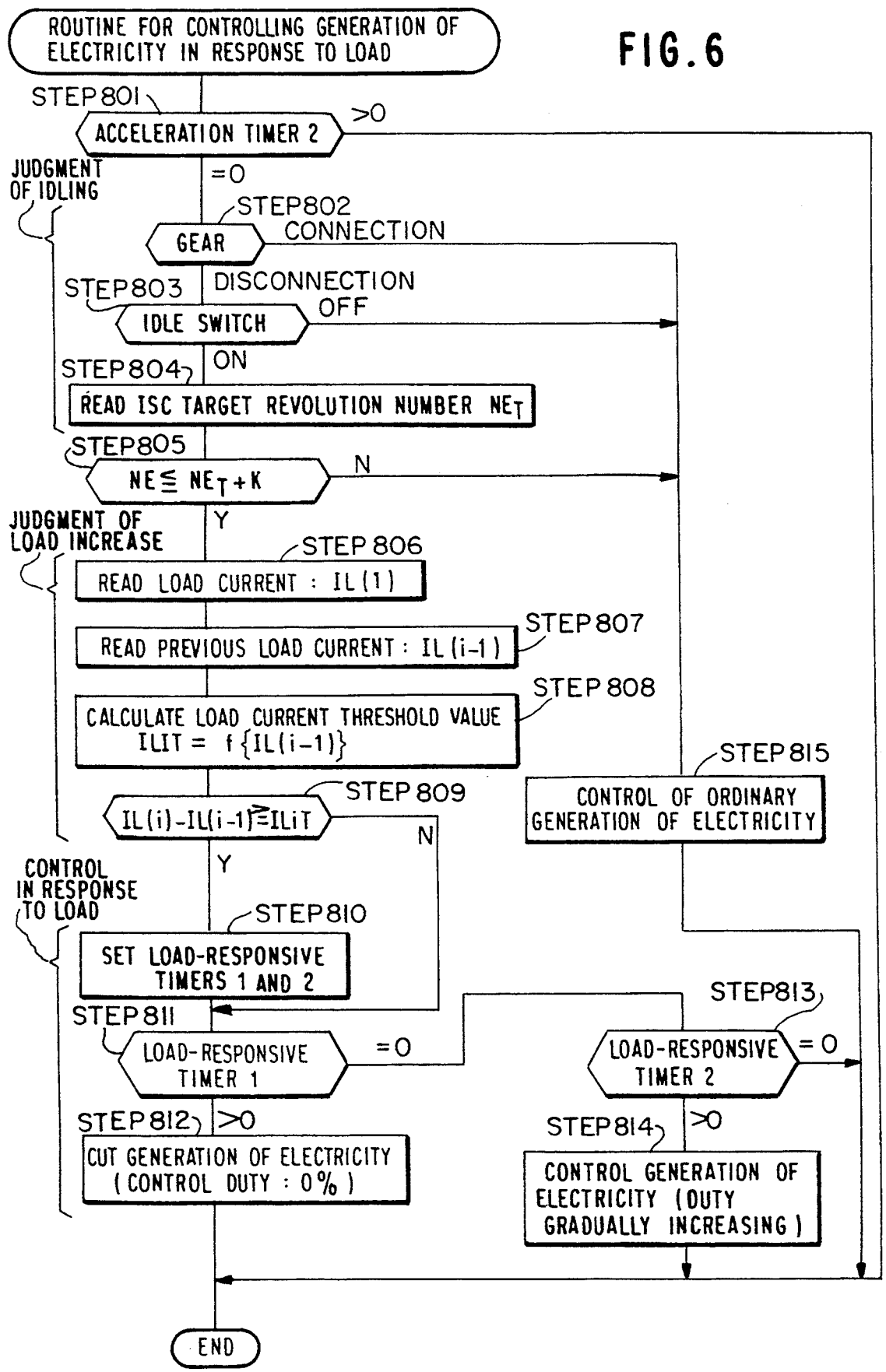
FIG. 6 is a flowchart showing the operation of a load-responsive control in the electronic control apparatus of the present invention.

FIGS. 6 and 7 are respectively a flowchart and a time chart showing the operation of the control of generation of electricity in response to a load. At Step 801, determination is made as to whether or not the acceleration timer 2 is 0. When the acceleration timer 2 is 0, determination of idling is conducted at Step 802 through Step 805. Namely, at Step 802, determination is made as to whether the gear is in a connection state or a disconnection state. When the gear is in a disconnection state, determination is made as to whether an idle switch is turned on or off at Step 803. When the idle switch is turned on, an ISC target revolution number $NE_T$ is read at Step 804. Then, determination is made as to whether or not an engine revolution number NE is in a relation: $NE \leq NE_T + K$ (K is a constant) at Step 805. When the above-mentioned formula is established, the operation step is moved to step 806 in the determination of an idling state. Otherwise, the operation step is moved to 815 and the ordinary electricity generation control is conducted.

Step 806 through Step 809 concern a routine as to whether the load is increased or not. Namely, a load current $I_L(i)$ is read at Step 806; the load current $I_L(i-1)$ at the previous time is read at Step 807; a load current threshold $I_{LIT}=f\{I_L(i-1)\}$ is calculated at Step 808; and determination is made as to whether or not a relationship $I_L(i)-I_L(i-1) \geq I_{LIT}$ is established at Step 809. When the relationship is established, the increase of the load current is determined. Then, load-responsive timers 1, 2 are set at Step 810. When the formula is not established, the operation step is moved to Step 811.

Figure 7A:
FIGS. 7(a)-7(f) comprise a time chart showing the operation of a load-responsive control in the electronic control apparatus.
Figure 7B:
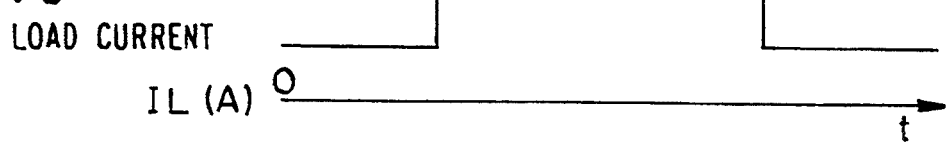
Figure 7C:
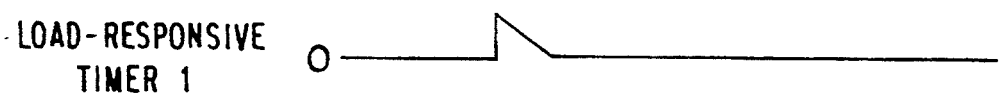
Figure 7D:
Figure 7E:
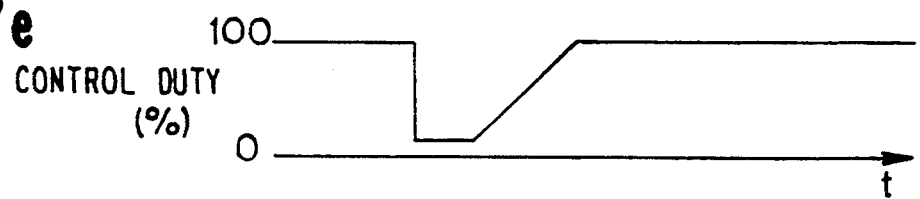
Figure 7F:
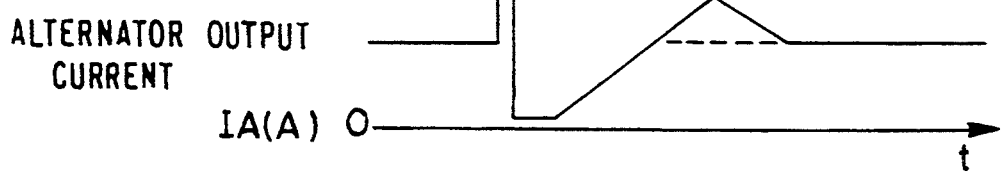

The load-responsive timers 1, 2 are simultaneously set as shown in FIGS. 7c and 7d wherein there is a relation of timer 1 < timer 2.

At Step 811, determination is made as to whether or not the timer 1 is 0. When the timer 1 is not 0, the control of stopping generation of electricity is conducted at Step 812. On the other hand, when the timer 1 is 0, the timer 2 is examined at Step 813. When the timer 2 is not 0, the control of generation of electricity (the duty is gradually increased) is performed at Step 814. When the timer 2 is 0, the ordinal electricity generating control is conducted at Step 815.

More detailed explanation of the timers 1 and 2 will be made. The control of the alternator in response to a load is to prevent the number of revolutions of the engine from decreasing, when an electric load is applied during the idling of the engine, the control being used together with an ISC load correction control (which will be described hereinbelow). Although it is known to provide a switch for an electrical load and to increase an intake air quantity at the time of operating the switch, it is not economical to provide such a switch for each of electrical loads because the number of connectors of the ECU7 is increased. In order to eliminate such disadvantage, there has been known to use such a technique that the alternator 2 itself detects a drop in battery voltage when any of the electrical loads is connected and the generation of electricity in the alternator is instantaneously stopped, and then, the generation of electricity is gradually increased. Such type of alternator is called a load-responsive type alternator wherein the voltage is so controlled as to be gradually returned to the original voltage in 5 through 10 seconds because it is necessary to match a rate sufficient to comply with a revolution number feedback control in the idle revolution control.

However, the above-mentioned technique has a disadvantage that there is a change of load during the controlling operation, or the headlights become dark for a relatively long time since a time of controlling is long. As another technique of control, there is known a method of load correction wherein an increase in electrical load is detected from an amount of increase in the output current of the alternator, and an intake air quantity is increased by means of the ISC valve 8. However, there is a delay in engine stroke (suction/compression/explosion/exhaustion) even though the air quantity is increased, and there is a three-stroke delay until an actual torque is produced. Accordingly, a drop in the number of engine revolutions is unavoidable just after an electrical load is corrected.

In accordance with the above-mentioned embodiment of the present invention, a load-responsive control for the alternator and an idle revolution load correction control are combined, whereby an initial drop of voltage is prevented, and an excellent control of idling revolution is obtained. The load responsive timer 1 is to compensate a delay of stroke as described above and corresponds to a time of about three strokes of engine. For instance, when an idle revolution number is 750 rpm, it provides about 120 ms in a case of using a four-cylinder engine.

The timer 2 is selected in a manner as follows. Namely, when an air quantity is increased stepwisely by means of the ISC valve 8, an air quantity sucked by the engine assumes an approximate value with a first-order lag which are substantially determined by an air volume VS at the downstream side of a throttle valve (which corresponds mainly to a volume of surge tank) and a cylinder capacity $V_C$ of each cylinder.

*Time constant* $\tau = V_S/V_C \times T$ where T is a frequency of idle revolution. Accordingly, the time period of the timer 2 is a time substantially equal to the time constant $\tau$ + the time period of the timer 1. By suitably selecting the above-mentioned factors, it is possible to obtain a load-responsive control having a time of about 1 second or less, and an excellent idle revolution control can be obtained in a relatively short time.

FIG. 8 is a time chart showing the operation of the electrical load correction control-in the idle revolution control wherein the idle speed control valve (ISCV) 8 is controlled and an intake air quantity to the engine is controlled. An increase in electrical load is detected by detecting an increase in a load current $I_L$ thus, control is conducted as mentioned below in response to an increase of a predetermined load current. At the same time, the alternator load-responsive control is conducted.

The duty ratio of the ISC valve 8 is increased in response to an increase of a load current. The ISC valve 8 may be a linear solenoid type to perform a duty control to control an air quantity. On the other hand, an engine torque appears with about a three-stroke delay (waste time) and a first-order delay. In this case, the engine revolution assumes a line indicated by a character C in FIG. 8e, if neither the alternator control nor the load correction by the ISC valve 8 is conducted. The engine revolution assumes a line indicated by a character B if the load correction by the ISC valve 8 is not conducted. When the both of the alternator control and the load correction by the ISC valve 8 are conducted in accordance with the above-mentioned embodiment wherein the waste time and the first-order delay are taken into consideration to perform the optimum control, a stable idle revolution control can be effected as shown by a line A without causing a drop in the number of engine revolutions.

EXAMPLE 2

Figure 9:
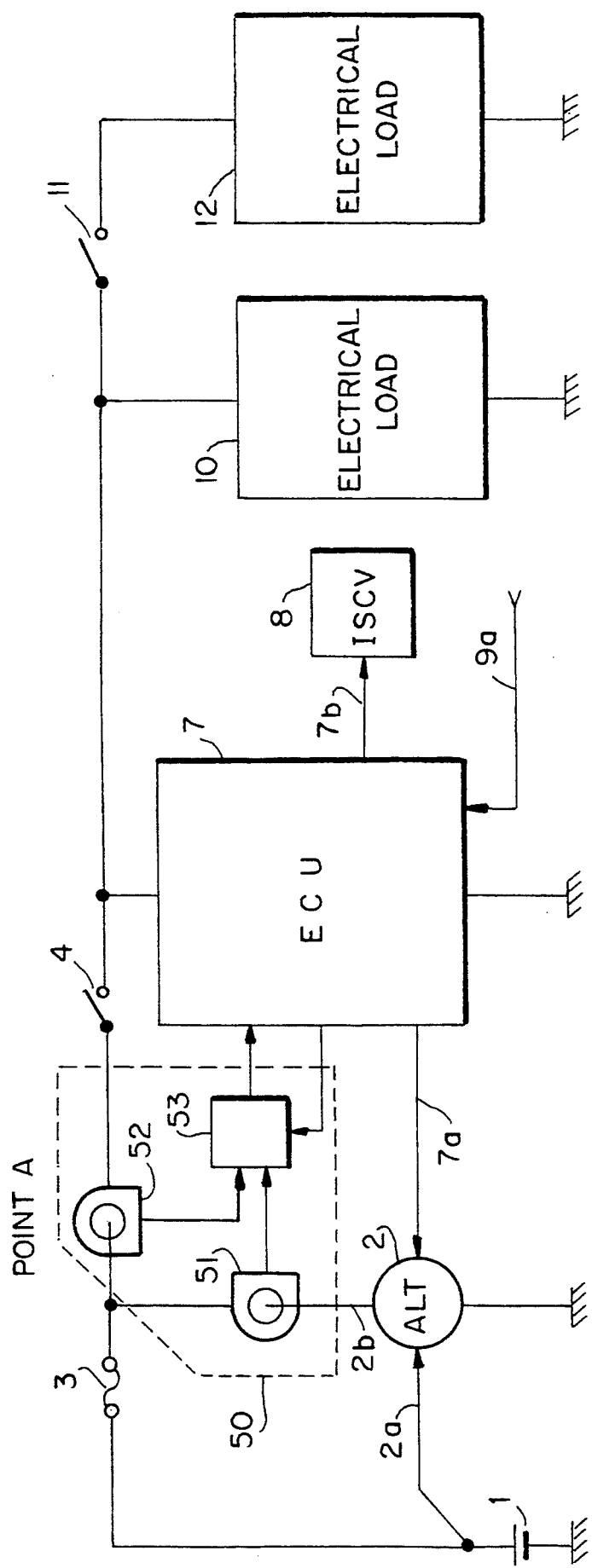
FIG. 9 is a diagram of a second embodiment of the electronic control apparatus according to the present invention.

FIG. 9 shows the construction of a second embodiment of the present invention. The second embodiment has a simpler structure than Example 1 to reduce cost. Specifically, current sensors 5 and 6 are gathered to a portion to thereby constitute a current sensor 50 having a simple structure. 51 and 52 designate current detecting members for the current sensors 5 and 6 and numeral 53 designates a circuit portion including an amplifier. The current sensor 50 can be arranged near the main fuse box, whereby the current detecting members 51, 52 can be closely located as if they form a one-piece body.

Figure 10:
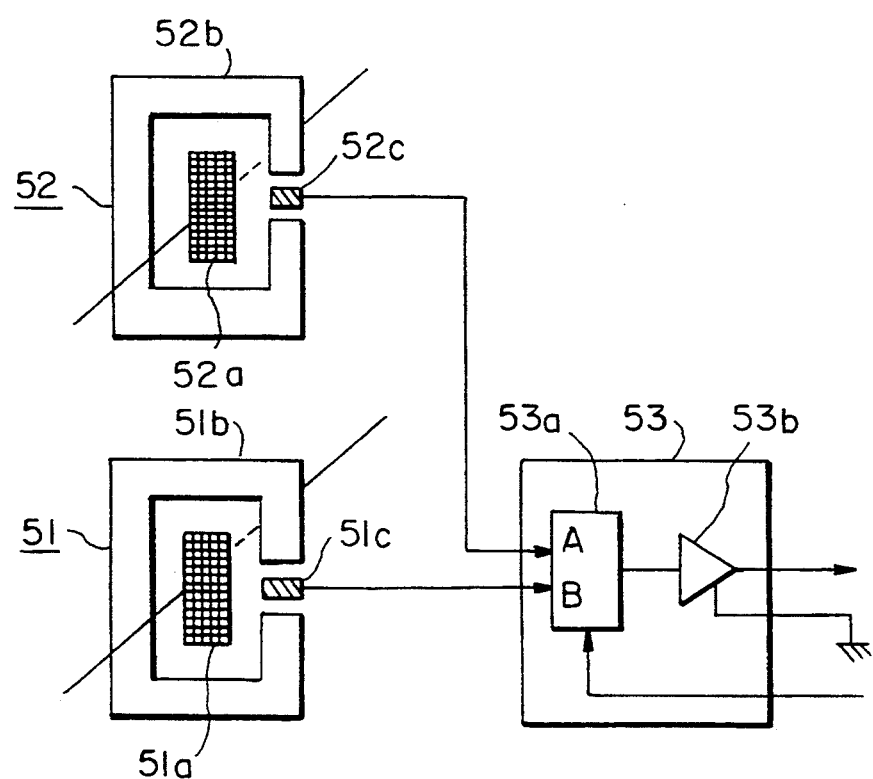
FIG. 10 is a diagram showing a current sensor used for the second embodiment of the electronic control apparatus of the present invention.

The current sensor 50 is described with reference to FIG. 10. A hall type current sensor is used for the current sensor 50. Numeral 51a designates a metallic bar through which a current flows, numeral 51b designates a core, and numeral 51c designates a hole element. When a current is passed through the metallic bar 51a, magnetic fluxes corresponding to the current are generated in the gap of the core 51b placed surrounding the bar 51a. The fluxes are detected by the hole element 51c to convert them into an electric signal. Numerals 51a through 52c designate the same elements as the above-mentioned. These are called current detecting members. The circuit portion 53 comprises a signal selector 53a and an amplifier 53b. The ECU7 selects the outputs of the current detecting members 51, 52 and receives an output as a voltage signal.

EXAMPLE 3

In Example 1, a load current $I_L$ is detected. However, a battery charging current $I_B$ may be detected for the load current $I_L$. The current $I_A$ of the alternator is formed of $I_L+I_B$, obtained by calculation when $I_A$ and $I_B$ are detected. In this case, the construction of the third embodiment is more complicated than that of the first embodiment having the current sensors 5, 6 because it is necessary to detect the direction of the current $I_B$.

Thus, in accordance with the present invention, since generation of electricity is stopped when an output current from the alternator has a predetermined value or lower, and the generation of electricity is resumed when a load current has a predetermined value or higher, fuel cost can be improved and an excellent control characteristic can be obtained. Further, since a load-responsive control for the alternator and an increase in an intake air quantity are conducted when the load current is increased, a drop in the number of revolutions during idling can be prevented, and stable idle revolution control can be conducted. In addition, the generation of electricity by the alternator at an acceleration of the engine is stopped for a predetermined time, and then, the output of the alternator is gradually increased. Accordingly, the acceleration characteristic can be improved by reducing a load to the engine at the acceleration time.

Obviously, numerous modifications and variations of the present invention are possible in light of the above teachings. It is therefore to be understood that within the scope of the appended claims, the invention may be practiced otherwise than as specifically described herein.

What is claimed is:

1. An electronic control apparatus for a vehicle, comprising:
   an alternator for charging a battery and supplying a load current,
   means for detecting an output current from the alternator,
   means for detecting the load current,
   means for comparing the detected output current to a first predetermined value and comparing the detected load current to a second predetermined value, and
   means for stopping, for a predetermined time, generation of electricity by the alternator when the comparing means determines that the output current is one of less than and equal to the first predetermined value and for allowing the alternator to resume generating electricity when the comparing means determines that the load current is one of greater than and equal to the second predetermined value.

2. An electronic control apparatus for a vehicle having an engine, comprising:
   an alternator for charging a battery and supplying a load current,
   a detector for detecting the load current,
   means for determining, in accordance with the detected load current, whether the load current is increasing, and
   means for controlling the alternator to stop generating electricity for a predetermined time when the determining means determines that the load current is increasing, and after the predetermined period of time has elapsed, controlling the alternator to gradually increasingly generate electricity and controlling an engine air input to gradually increasingly supply air to the engine.

* * * * *